United States Patent
Hsu et al.

(10) Patent No.: US 9,876,559 B2
(45) Date of Patent: Jan. 23, 2018

(54) METHOD FOR RELAYING SIGNAL AND RELAY USING THE SAME

(71) Applicant: Industrial Technology Research Institute, Hsinchu (TW)

(72) Inventors: Kai-Cheng Hsu, New Taipei (TW); Hung-Yu Wei, Taipei (TW)

(73) Assignee: Industrial Technology Research Insitute, Hsinchu (TW)

( * ) Notice: Subject to any disclaimer, the term of this patent is extended or adjusted under 35 U.S.C. 154(b) by 135 days.

(21) Appl. No.: 14/977,665

(22) Filed: Dec. 22, 2015

(65) Prior Publication Data

US 2016/0269202 A1 Sep. 15, 2016

Related U.S. Application Data

(60) Provisional application No. 62/131,253, filed on Mar. 11, 2015.

(51) Int. Cl.
   *H04B 7/155* (2006.01)

(52) U.S. Cl.
   CPC .............................. *H04B 7/15507* (2013.01)

(58) Field of Classification Search
   CPC ........................................... H04B 7/14–7/216
   See application file for complete search history.

(56) References Cited

U.S. PATENT DOCUMENTS

| | | | | |
|---|---|---|---|---|
| 8,630,310 | B2 | 1/2014 | Sethakaset et al. | |
| 2001/0031624 | A1* | 10/2001 | Schmutz | H04B 7/15535 |
| | | | | 455/13.4 |
| 2009/0047901 | A1* | 2/2009 | Yu | H04B 7/022 |
| | | | | 455/7 |
| 2010/0027458 | A1 | 2/2010 | Wu et al. | |
| 2010/0246599 | A1* | 9/2010 | Wang | H04L 27/0008 |
| | | | | 370/465 |
| 2011/0244790 | A1 | 10/2011 | Kwak et al. | |
| 2012/0300680 | A1 | 11/2012 | Pietsch et al. | |
| 2013/0034044 | A1 | 2/2013 | Hatefi et al. | |
| 2013/0182582 | A1 | 7/2013 | Bontu et al. | |
| 2015/0215138 | A1* | 7/2015 | Dorman | H04L 25/03076 |
| | | | | 375/233 |

FOREIGN PATENT DOCUMENTS

| | | |
|---|---|---|
| CN | 102098263 | 6/2011 |
| JP | 2003298548 | 10/2003 |
| TW | 201238300 | 9/2012 |

OTHER PUBLICATIONS

Bharadia et al., "FastForward: Fast and Constructive Full Duplex Relays,"Proceedings of the 2014 ACM conference on SIGCOMM , Aug. 17-22, 2014, pp. 199-210.

(Continued)

*Primary Examiner* — Pao Sinkanatarakorn
(74) *Attorney, Agent, or Firm* — JCIPRNET

(57) ABSTRACT

A method for relaying signal and a relay using the same are proposed. The method is applicable to a relay. The method includes: receiving a signal with power allocation from a source; demodulating the signal to extract a symbol; re-modulating the symbol to a re-modulated symbol; and transmitting the re-modulated symbol to a destination according to a specific delay.

16 Claims, 4 Drawing Sheets

(56) References Cited

OTHER PUBLICATIONS

Khafagy et al., "On the Outage Performance of Full-Duplex Selective Decode-and-Forward Relaying," IEEE Communications Letters, Jun. 2013, pp. 1180-1183.
Day et al., "Full-Duplex MIMO Relaying: Achievable Rates Under Limited Dynamic Range," IEEE Journal on Selected Areas in Communications, Sep. 2012, pp. 1541-1553.
Riihonen et al., "Hybrid Full-Duplex/Half-Duplex Relaying with Transmit Power Adaptation," IEEE Transactions on Wireless Communications, Sep. 2011, pp. 3074-3085.
Zhang et al., "Study of Gaussian Relay Channels with Correlated Noises," IEEE Transactions on Communications, Mar. 2011, pp. 863-876.
"Office Action of Taiwan Counterpart Application", dated Oct. 20, 2016, p. 1-p. 6.

* cited by examiner

METHOD FOR RELAYING SIGNAL AND RELAY USING THE SAME

CROSS-REFERENCE TO RELATED APPLICATION

This application claims the priority benefits of U.S. provisional application Ser. No. 62/131,253, filed on Mar. 11, 2015. The entirety of the above-mentioned patent application is hereby incorporated by reference herein and made a part of this specification.

1. Technical Field

The present invention generally relates to a method for relaying signal and a relay using the same.

2. Background

Duplex communication systems are widely used in the area of telecommunications and especially in telephony and computer networking. Existing duplex wireless communication systems include half-duplex and full-duplex types.

Half-duplex wireless communication systems provide for communication in two directions, but only in one direction at a time. Thus, while the transmitter is transmitting, the receiver must wait until the transmitter stops before transmitting. This makes the half-duplex wireless communication systems inefficient and hard to widely implement in wireless network systems because it requires nearly twice time slots to complete the half-duplex wireless communication systems transmission.

Full-duplex wireless communication systems are capable of transmitting and receiving data-carrying signals simultaneously. Such systems enable the receivers to receive signals at the same time as transmissions are being made. However, the current wireless communication systems are still half-duplex, TDD (Time Division Duplex) or FDD (Frequency Division Duplex), is that there are no feasible hardware solutions for full-duplex wireless communication systems in the past.

Although some research groups start to propose some feasible solutions and design a real full-duplex radio to current wireless communication systems or future wireless communication systems, the technical problem to be solved is how the full-duplex radio to assist the source to transmit data to the destination and increase the maximum achievable rate simultaneously. In other words, it is now one of most concerned issues for person skilled in the art as how to develop a full-duplex radio in wireless communication systems.

SUMMARY

Accordingly, the present invention is directed to a method for relaying signal and a relay using the same, by which the relay can perform two different transmission topologies comprising the diversity mode and the multiplexing mode. Both of the transmission enable a source to a destination a higher network throughput and provide better system performance.

One exemplary embodiment of the disclosure, the present disclosure provides a method for relaying signal, which is adapted to a relay. The method includes the following steps: receiving a signal with power allocation from a source; demodulating the signal to extract a symbol; re-modulating the symbol to a re-modulated symbol; and transmitting the re-modulated symbol to a destination according to a specific delay.

Another exemplary embodiment of the disclosure, the present disclosure provides a relay, which includes a transceiver circuit, a storage circuit, and a processing circuit. The processing circuit is coupled to the transceiver circuit and the storage circuit. The processing circuit is configured to access the program codes to perform operations of: receiving a signal with power allocation from a source through the transceiver circuit; demodulating the signal to extract a symbol; re-modulating the symbol to a re-modulated symbol; and transmitting the re-modulated symbol to a destination according to a specific delay through the transceiver circuit.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

DESCRIPTION OF THE EMBODIMENTS

Figure 1:
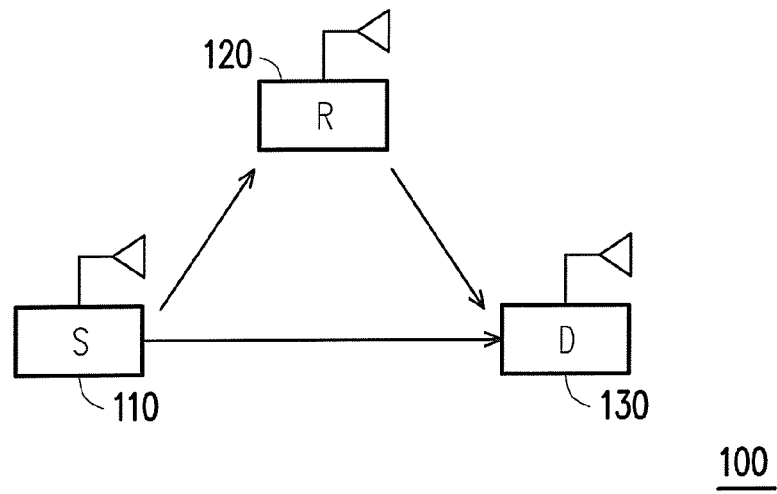
FIG. 1 is a schematic diagram illustrating a relay system according to an embodiment of the disclosure.

Reference will now be made in detail to the present exemplary embodiments of the invention, examples of which are illustrated in the accompanying drawings. Wherever possible, the same reference numbers are used in the drawings and the description to refer to the same or like parts.

The term "coupling/coupled" used in this specification (including claims) may refer to any direct or indirect connection means. For example, "a processing circuit is coupled to a transceiver circuit" should be interpreted as "the processing circuit is directly connected to the transceiver circuit" or "the processing circuit is indirectly connected to the transceiver circuit through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic diagram illustrating a relay system 100 according to an embodiment of the disclosure. The relay system 100 is a full-duplex wireless communication system and is capable of transmitting and receiving data simultaneously. The relay system 100 includes a source node 110, a relay node 120 and a destination node 130, but the feasible embodiments of the disclosure are not limited thereto.

The source node 110, the relay node 120 and the destination node 130 may be presented as various implementations, which may (but not limited to) include, for example, a mobile station, an advanced mobile station (AMS), a server, a user terminal, a notebook computer, a network computer, a workstation, a personal digital assistant (PDA), a phone device, a pager, a camera, a television, a handheld video game device, a wireless sensor, an eNB, a home eNB (HeNB), an advanced base station (ABS), a base transceiver system (BTS), an access point, a home base station, a scatterer, a repeater, an intermediate node, an intermediary and/or a satellite-based communication base station, etc.

In the present embodiment, the source node 110 may transmit signal to both the relay node 120 and the destination node 130. The relay node 120 may receive the signal from the source node 110, demodulate the signal to extract the symbol and re-modulate the symbol. The relay node 120 may also transmit the re-modulated symbol to the destination node 130 when receive the signal from the source node 110. The destination node 130 may receive the signal from both the source node 110 and the relay node 120, and decode the received signal to extract the data symbol. It is noted that when the source node 110 transmits data to the destination node 130, the relay node 120 is a device that assist the source node 110 in transmitting data to the destination node 130.

Figure 2:
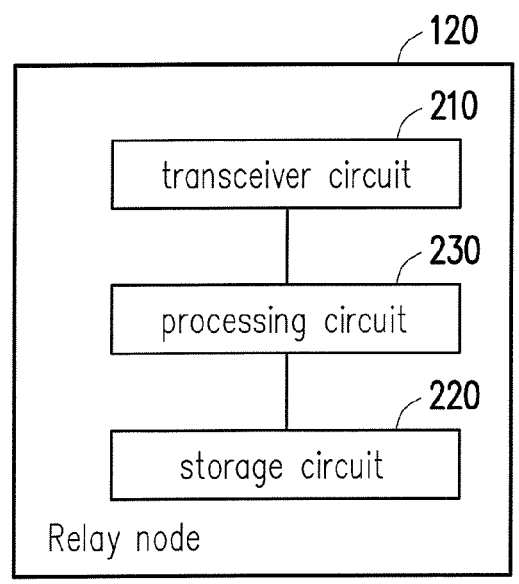
FIG. 2 is a block diagram illustrating the relay node according to an embodiment of the disclosure.

Further, the relay node 120 may be represented by at least the functional elements as illustrated in FIG. 2. FIG. 2 is a block diagram illustrating the relay node 120 according to an embodiment of the disclosure. The relay node 120 may at least (but not limited to) include a transceiver circuit 210, a storage circuit 220 and a processing circuit 230. The transceiver circuit 210 functions as a general network interface card and is configured for transmitting and receiving data with the source node 110 and the destination node 130 in FIG. 1. The storage circuit 220 is, for example, a memory, a hard disk or other devices for storing data and is configured to store a plurality of program codes or modules.

The processing circuit 230 is coupled to the transceiver circuit 210 and the storage circuit 220. The processing circuit 230 may be, for example, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), any other types of integrated circuit, state machine, advanced RISC machine (ARM)-based processor and similar devices, which construes no limitations to the disclosure. The processing circuit 230 is configured to access the program codes stored in the storage circuit 220.

In the disclosure, there are two different transmission topologies for the relay system 100. Based on the different transmission topologies, the methods are defined as the diversity mode and the multiplexing mode for the relay system 100. Hence, the processing circuit 230 in the relay node 120 is configured to access the program codes to perform operations of the diversity mode and the multiplexing mode respectively. In the following section, they will be described with specific examples according to the present invention to provide a detailed description.

Figure 3:
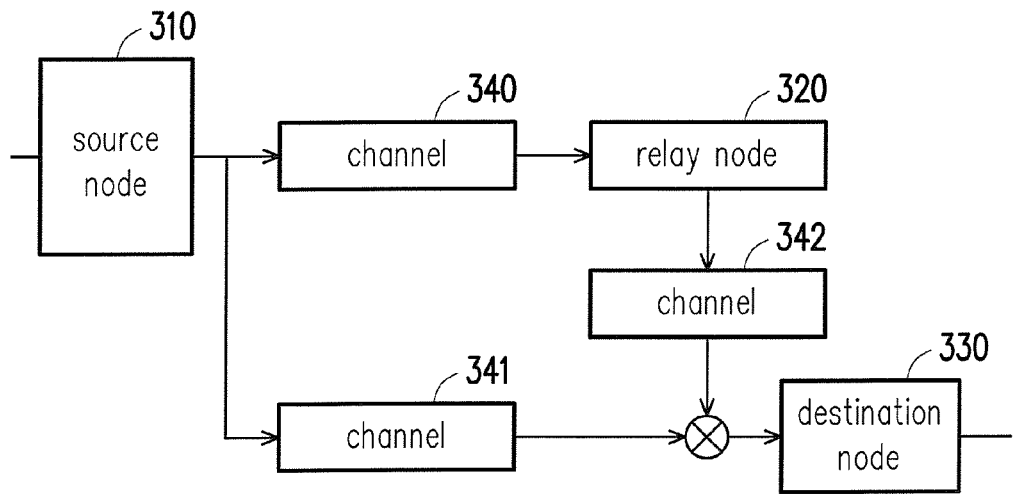
FIG. 3 is a basic block diagram illustrating a relay system in diversity mode according to an embodiment of the disclosure.

First, FIG. 3 is a basic block diagram illustrating a relay system 300 in diversity mode according to an embodiment of the disclosure. Referring to FIG. 3, the relay system 300 includes a source node 310, a relay node 320, a destination node 330 and the channels 340, 341 and 342. The functions of the source node 310, the relay node 320 and the destination node 330 shown in FIG. 3 are the same as the source node 110, the relay node 120 and the destination node 130 shown in FIG. 1 and will not be repeated here. It is noted that the relay system 300 is not limited to certain channel scenario or networking system. In other words, it can be used in any channel scenario or networking system. In one embodiment, it is applied the single carrier single tap channel to the channels 340, 341 and 342 with diversity mode transmission.

Figure 4:
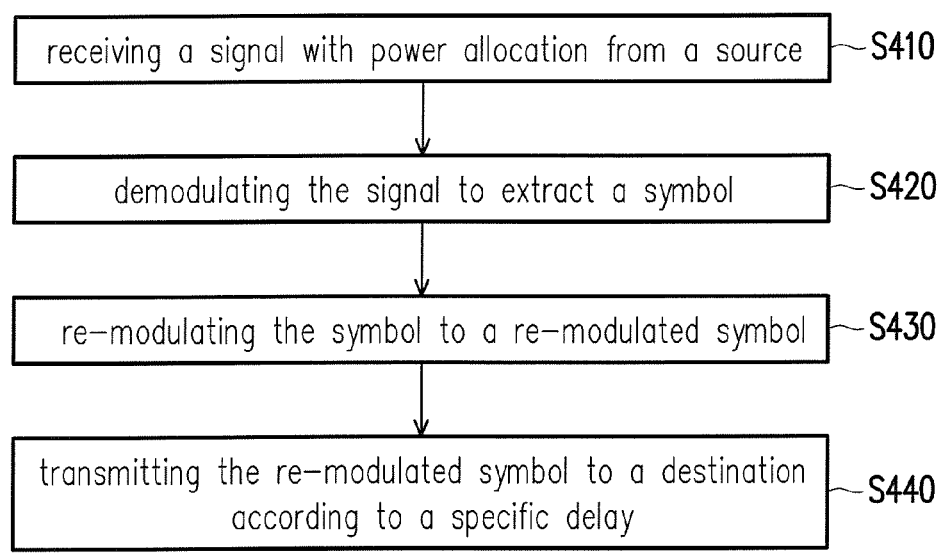
FIG. 4 is a flowchart illustrating a method for relaying signal for relay node according to an embodiment of the disclosure.

FIG. 4 is a flowchart illustrating a method for relaying signal for relay node according to an embodiment of the disclosure. Referring to FIG. 2, FIG. 3 and FIG. 4, the method for relaying signal for relay node 320 of the present embodiment is applied to the relay system 300 illustrated in FIG. 3, and each step of the method for relaying signal for relay node 320 of the disclosure will be described below with reference to each element depicted in FIG. 2.

In step S410, the processing circuit 230 of the relay node 320 receives a signal with power allocation from the source node 310 through the transceiver circuit 210. In the present embodiment, the processing circuit 230 of the relay node 320 would receive a signal with power allocation from the source node 310 through the transceiver circuit 210. The signal transmitted by the source node 310 is a combined signal comprising a current symbol and a past symbol with power allocation respectively.

In detail, it first defined the parameters that $\tau$ represents one symbol duration and k represents the k-th symbol duration, where the symbol duration $\tau$ is based on the different wireless networks symbol duration specification and is not limited thereto. Since the source node 310 starts transmission at time $t_0$, the first symbol duration may be expressed as $t_0 \sim t_0 + \tau$, the second symbol duration may be expressed as $t_0 + \tau \sim t_0 + 2\tau$, and so on. Because of the relay node 320 would transmit a signal after receives the signal from the source node 310, it will delay a specified time to transmit an adjusted signal. Therefore, the data transmitted by the source node 310 in diversity mode is defined as in the following pattern:

$$s_k = \begin{cases} \sqrt{\alpha}\, x_k & , k < \delta \\ \sqrt{\alpha}\, x_k + \sqrt{1-\alpha}\, x_{k-\delta+1} & , k \geq \delta \\ \sqrt{1-\alpha}\, x_{k-\delta+1} & , k > L \end{cases} \quad \text{Eq. (1)}$$

In Eq. (1), k represents the k-th symbol duration and is an any positive integer, $s_k$ represents the signal in the k-th symbol duration, $x_k$ represents the k-th symbol, $\alpha$ represents a power allocation factor and is any real value number between 0 and 1, $\delta$ represents a delay factor and is any positive integer greater than 1, and L represents a number of total symbols and can be any positive integer. It is noted that the delay factor $\delta$ can be setting dynamically in our disclosure and the power allocation factor $\alpha$ is a factor which can affect the system performance according to the relay node 310 and the destination node 330 design. Besides, the L symbols may be modulated according to different type of modulation scheme, e.g., binary phase shift keying (BPSK), but the disclosure is not limited thereto.

In step S420, the processing circuit 230 of the relay node 320 demodulates the signal to extract a symbol. In step S430, the processing circuit 230 of the relay node 320 re-modulates the symbol to a re-modulated symbol. In the present embodiment, the relay node 320 receives the signal from the source node 310, and then demodulates the signal with same modulation type as the source node 310 to obtain one or several symbols which is modulated by the source node 310. The relay node 320 would re-modulate the one or several symbols. It is noted that the relay node 320 in diversity mode would use the same modulation type as the source node 310 to re-modulate the symbol. For instance, if the source node 310 uses QPSK modulation, then the relay node 320 also uses QPSK modulation, but the disclosure is not limited to any modulation type.

In one embodiment, the processing circuit 230 of the relay node 320 may further access the program codes to perform an operation of rotating the re-modulated symbol by multiplying a rotation factor w, which may be a complex value. The rotation factor is to align the relay signal to the direction of source signal at destination side, and it will not modify the amplitude of the signal, i.e., the length of the rotation factor w is absolutely one, i.e., $|w|=1$. In this way, the signal from the source node 310 and the signal from the relay node 320 can add up directly. Otherwise, if it does not apply the rotation factor, the signal from the source node 310 and the signal from the relay node 320 might have 180 degree offset which may create destructive interference and decrease the signal strength of the signal received in the destination node 330.

In step S440, the processing circuit 230 of the relay node 320 transmits the re-modulated symbol to a destination according to a specific delay through the transceiver circuit 210. In the present embodiment, the specific delay is a specified time until a certain symbol duration start, which can be expressed by the delay factor δ, e.g., the relay node 320 may delay a specified time until the δ-th symbol duration start. In other words, the relay node 320 re-modulates the one or several symbols and transmits to the destination node 330 at future symbol duration according to the delay factor δ. For example, the relay node 320 demodulates and extract the data symbol $x_k$ after receiving the signal $s_k$ at the k-th symbol duration. The relay node 320 then re-modulates the data symbol $x_k$ as the same symbol and transmits the re-modulated symbol at (k+δ−1)-th symbol duration (i.e., $t_0+(k+δ−2)\tau \sim t_0+(k+δ−1)\tau$). It is worth mentioning that, the process of re-modulated and delay enable the relay node 320 to remove the noise signal when receiving signal from the source node 310. Hence, this can prevent relay from forwarding unwanted noise signal to the destination node 330 which then increase the receiving quality of the destination node 330.

Finally, the destination node 330 may receive the mixed signal from the source node 310 and the relay node 320, and demodulate the received signal by using the maximum likelihood (ML) decoding. For example, it is assumed a single carrier single tap channel with diversity mode transmission with the delay factor δ is 2 and the total number of transmitted symbol L from the source node 310 is 3 (i.e., δ=2, L=3).

Then the signal received by the destination node 330 may be expressed as:

$$y_1 = h_1 x_1 + n_1$$

$$y_2 = h_1 x_2 + h_2 x_1 + n_2$$

$$y_3 = h_1 x_3 + h_2 x_2 + n_3$$

$$y_4 = h_2 x_3 + n_4 \qquad \text{Eq. (2)}$$

wherein $h_1 = \sqrt{\alpha} h_{sd}$ and $h_2 = \sqrt{1-\alpha} h_{sd} + w h_{rd}$.

In Eq. (2), $y_k$ represents the received k-th signal, $x_k$ represents the transmitted k-th symbol, $h_{sd}$ is the channel between the source node 310 and the destination node 330, $h_{rd}$ is the channel between the relay node 320 and the destination node 330, $n_k$ is the received noise at $y_k$, which is assumed to be Gaussian random variables with zero mean and variance of one (but is not limited thereto) and W is the rotation factor. In the present embodiment, the rotation factor may set to $$\frac{h_{sd} |h_{rd}|}{h_{rd} |h_{sd}|},$$

which enables the signal from the source node 310 and the signal from the relay node 320 have the same angle. Thus, the signal from the source node 310 and the signal from the relay node 320 can add up directly. But the rotation factor is not necessary to be $$\frac{h_{sd} |h_{rd}|}{h_{rd} |h_{sd}|},$$

because the system can operate in any value of rotation factor.

The destination node 330 will find the maximum likelihood symbol $\tilde{x}_1 \sim \tilde{x}_3$ according to the received signal $y_1 \sim y_4$, which is transmitted by the source node 310 and the relay node 320. The destination node 330 may obtain the maximum likelihood solution through the maximum likelihood method, e.g., Viterbi algorithm, but the disclosure is not limited thereto.

In the present embodiment, it is assumed that each state represents one solution symbol, i.e., state 1 represents the solution for symbol $x_1$, state 2 represents the solution for symbol $x_2$ and state 3 represents the solution for symbol $x_3$. Each state will record the minimum distance between the received signal and the given state representing symbol, which may be expressed by the following formulas:

$$\text{Initialize } V_k = |y_1 - h_1 s_K|^2 \quad k = 1 \sim 4 \qquad \text{Eq. (3)}$$

$$\text{In state 1: } V_k = \min_z(v_z + |y_2 - h_1 s_K - h_2 s_Z|^2)$$

$$k, z = 1 \sim 4$$

$$\text{In state 2: } V_k = \min_z(v_z + |y_3 - h_1 s_K - h_2 s_Z|^2)$$

$$k, z = 1 \sim 4$$

$$\text{In state 3: } V_k = V_k + |y_4 - h_2 s_K|^2 \quad k = 1 \sim 4$$

In Eq. (3), since the source node 310 and the relay node 320 modulated the symbol by QPSK modulation, the given state representing symbols $s_K$ and $s_Z$ may be expressed as 00, 01, 10 or 11, respectively. The minimum distance V can be estimated state by state until the last state. The last state will record the minimum distance V for a given $x_3$. Therefore, the maximum-likelihood solution for $\tilde{x}_1 \sim \tilde{x}_3$ can be found.

In short, in the method for relaying signal in diversity mode, the relay receives a combined signal comprising a current symbol and a past symbol with power allocation respectively. The relay may demodulate the received combined signal from source, re-modulates the demodulated symbol with same modulation type as the source and transmits the re-modulated symbol to destination. As such, the process of re-modulated and delay enable relay to remove the noise signal when receiving signal from source and prevent relay from forwarding unwanted noise signal to destination. In addition, destination may utilize both signal from source and signal from destination to decode the data with ML decoding. As a result, through the mechanism of relaying signal in diversity mode, the method proposed by the disclosure not only increase the receiving quality of destination but also improve the system throughput from both of the relay-to-destination link and the source-to-destination link.

In other embodiment, it also can use the different type of channel and OFDM system, but the disclosure is not limited thereto. For instance, it is assumed that there is two subcarrier in the OFDM system. Hence, the symbols will be divided into two groups. But the received signal at each subcarrier can use the same decoding method as mentioned above to find the maximum-likelihood solution independently. Further, the diversity mode transmission can also be used in single carrier multiple tap channel, and the received signal can be decoded in a similar manner as mentioned above to find the maximum-likelihood solution.

Figure 5:
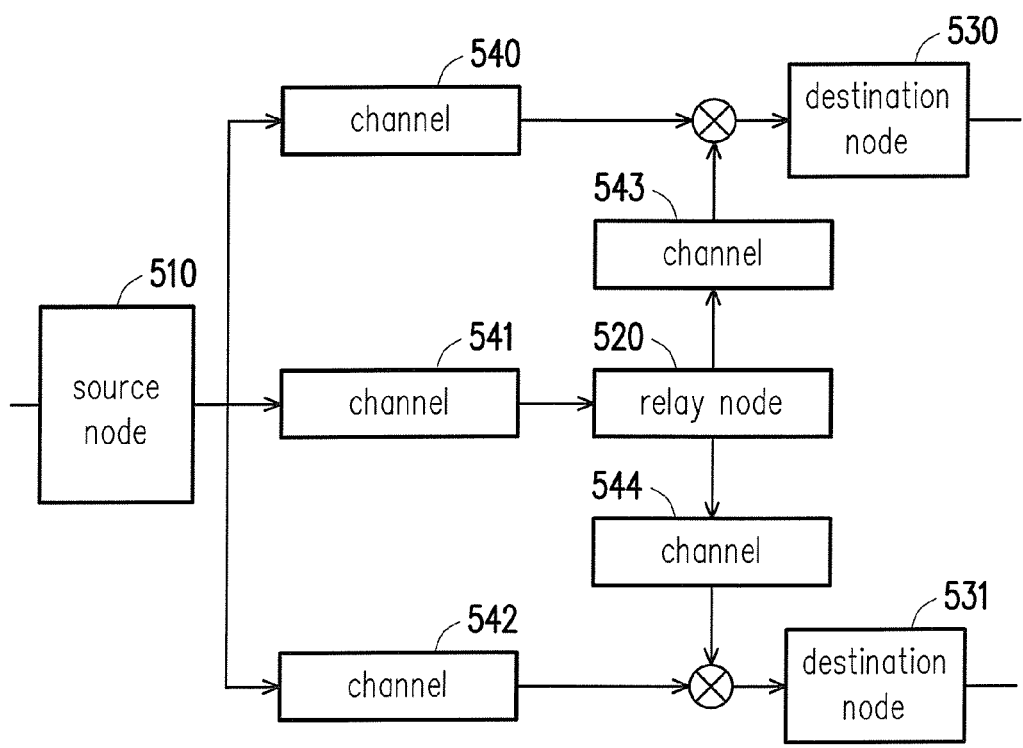
FIG. 5 is a basic block diagram illustrating a relay system in multiplexing mode according to an embodiment of the disclosure.

Next, FIG. 5 is a basic block diagram illustrating a relay system 500 in multiplexing mode according to an embodiment of the disclosure. Referring to FIG. 5, the relay system 500 includes a source node 510, a relay node 520, two destination nodes 530, 531 and the channels 540, 541, 542, 543 and 544. The functions of the source node 510, the relay node 520 and the destination nodes 530, 531 shown in FIG. 5 are the same as the source node 110 and the relay node 120 and the destination node 130 shown in FIG. 1 and will not be repeated here. The main difference between FIG. 5 lies in that there are two destination nodes 530 and 531 in the relay system 500. Besides, the relay system 500 is also not limited to certain channel scenario or networking system. In one embodiment, it is also applied the single carrier single tap channel 540~544 with multiplexing mode transmission.

Figure 6:
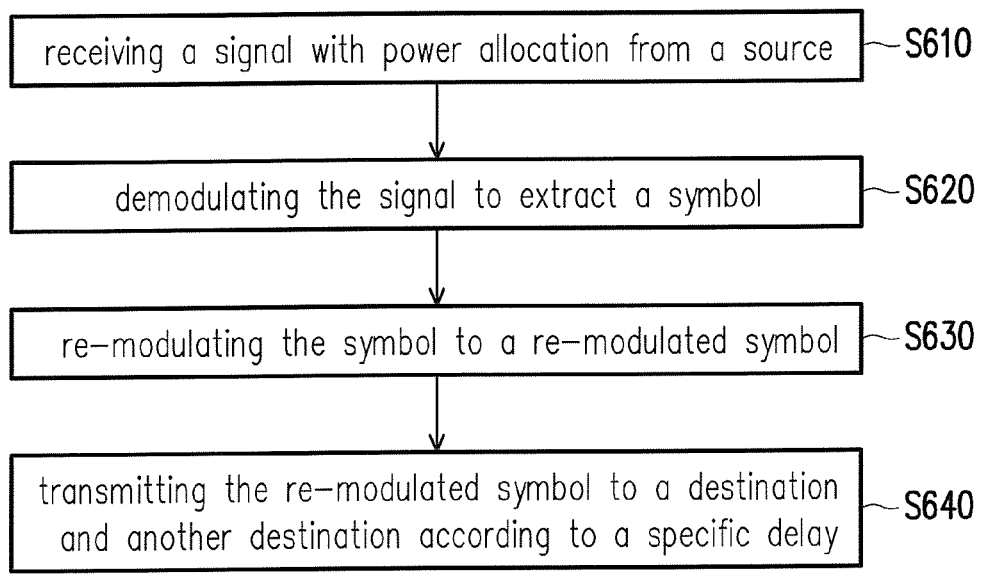
FIG. 6 is a flowchart illustrating a method for relaying signal for relay node according to an embodiment of the disclosure.

FIG. 6 is a flowchart illustrating a method for relaying signal for relay node according to an embodiment of the disclosure. Referring to FIG. 2, FIG. 5 and FIG. 6, the method for relaying signal for relay node 520 of the present embodiment is applied to the relay system 500 illustrated in FIG. 5, and each step of the method for relaying signal for relay node 520 of the disclosure will be described below with reference to each element depicted in FIG. 2.

In step S610, the processing circuit 230 of the relay node 520 receives a signal with power allocation from the source node 510 through the transceiver circuit 210. In the present embodiment, the processing circuit 230 of the relay node 520 would receive a signal with power allocation from the source node 510 through the transceiver circuit 210. It is noted that the power allocation comprises a power allocation factor with value of one in the multiplexing mode. Besides, the signal transmitted by the source node 510 comprises only the current symbol, which is different with the diversity mode.

Hence, the data transmitted by the source node 510 can be expressed as $x_1 \sim x_k$, where $x_k$ is the k-th modulated symbol. It is assumed that the number of data transmitted by the source node 510 contains L symbols, where L can be any positive integer. The L symbols may be modulated according to different type of modulation scheme, e.g., quadrature phase shift keying (QPSK), but the disclosure is not limited thereto. The source node 510 would transmit data $x_1 \sim x_k$ to the relay node 520 and the two destination nodes 530~531 simultaneously.

In step S620, the processing circuit 230 of the relay node 520 demodulates the signal to extract a symbol. In step S630, the processing circuit 230 of the relay node 520 re-modulates the symbol to a re-modulated symbol.

In the present embodiment, the relay node 520 receives the signal from the source node 510, and then demodulates the signal with same modulation type as the source node 510 to obtain demodulated symbol. Then, the relay node 520 would re-modulate the demodulated symbol. But it should be noted that the relay node 520 in multiplexing mode would re-modulate the demodulated symbol with lower modulation type than the source node 510. For instance, if the source node 510 uses QPSK modulation, the relay node 520 may use BPSK modulation to modulate the demodulated symbols since one QPSK symbol can be divided into two BPSK symbols, but the disclosure is not limited to any modulation type.

Therefore, the relay node 520 may demodulate the signal to obtain the demodulated symbols $x_1 \sim x_k$. Then, the relay node 520 re-modulates the demodulated symbols $x_1 \sim x_k$ to the re-modulated symbols $x_1' \sim x_m'$, where $x_m'$ is the m-th re-modulated symbol. It is noted that the re-modulated symbols $x_1' \sim x_M'$ are expanded by the demodulated symbols $x_1 \sim x_L$, where M is total number of the re-modulated symbols which is a positive integer greater than L and is based on the modulation type of both the source node 510 and the relay node 520.

In step S640, the processing circuit 230 of the relay node 520 transmits the re-modulated symbol to a destination and another destination according to a specific delay through the transceiver circuit 210.

In the present embodiment, it should be noted that there are two destination nodes 530, 531 in the relay system 500. Thus, the relay node 520 would transmit the re-modulated symbol to both of the destination node 530 and 531. Since the relay node 520 re-modulates the demodulated symbols $x_1 \sim x_k$, the relay node 520 would transmit the re-modulated symbol $x_1' \sim x_m'$ with specific delay to the destination nodes 530 and 531. The specific delay is a specified time until a certain symbol duration start, which can be expressed by the delay factor δ, e.g., the relay node 520 may delay a specified time until the δ-th symbol duration start. It is noted that the delay factor δ can be any positive integer greater than 1 and be setting dynamically in our disclosure.

In the present embodiment, it is defined that τ represents one symbol duration, where the parameter τ is based on the different wireless networks symbol duration specification. The source node 510 starts transmission at time $t_0$. Since the relay node 520 would re-modulate the demodulated symbols $x_1 \sim x_k$ by using the lower modulation type, the source node 510 will finish the transmission of $x_1 \sim x_k$ at time $t_0+L\tau$ while the relay node 520 will finish the transmission of $x_1' \sim x_m'$ at time $t_0+(M+\delta-1)\tau$. In this way, the source node 510 will idle at the time between $t_0+L\tau$ and $t_0+(M+\delta-1)\tau$. Hence, the source node 510 will transmit the second data symbol of $x_1'' \sim x_{M+\delta-L-1}''$ between $t_0+L\tau$ and $t_0+(M+\delta-1)\tau$.

In one embodiment, it is assumed that the delay factor δ is 3 for the relay node 520 and the total number of transmitted symbols L from the source node 510 is 4 (i.e., δ=3, L=4). The source node 510 use QPSK modulation and the relay node 520 use BPSK modulation. Since the data symbol transmitted by the source node 510 is $x_1 \sim x_4$, the relay node 520 re-modulates the received symbol with BPSK into $x_1' \sim x_8'$. Hence, there are six idle symbol duration before the relay node 520 completing the transmission. Then, the source node 510 may transmit the second data symbol $x_1'' \sim x_6''$ in these six symbol duration.

In the present embodiment, since there are two destination nodes 530, 531 to receive the mixed signals from the source node 510 and the relay node 520, one of the destination nodes 530, 531 (e.g., the destination nodes 530) will extract the first data symbol with the relay node 520 which transmits symbol $x_1'\sim x_m'$ while viewing the data transmitted by the source node 510 as interference at time $t_0+(\delta-1)\tau$ to $t_0+(M+\delta-1)\tau$. Another destination node (e.g., the destination node 531) will extract the second data symbol with the source node 510 which transmits symbol $x_1''\sim x_{M+\delta-L-1}''$ while viewing the signals transmitted by the relay node 320 as interference at time $t_0+L\tau$ and $t_0+(M+\delta-1)\tau$.

The mixed signals from the source node 510 and the relay node 520 which are received by the destination nodes 530 or 531 may be expressed as $y_{n,k}$, where $y_{n,k}$ is the received signal in k-th symbol duration at the destination node n and is a mixed signal with $x_k$ and $x_m'$. The destination node 530 receives the mixed signal from the source node 510 and the relay node 520 at time $t_0+(\delta-1)\tau$ and $t_0+(M+\delta-1)\tau$. The destination node 530 simply demodulates the received signal $y_{530,1}\sim y_{530,M}$ to extract the symbol $x_1'\sim x_M'$ transmitted by the relay node 520 while viewing the signal transmitted by the source node 510 as interference. The destination node 531 receives the mixed signal from the source node 510 and the relay node 520 at time $t_0+L\tau$ and $t_0+(M+\delta-1)\tau$. The destination node 531 also simply demodulates the received signal $y_{531,1}\sim y_{531,m+\delta-L-1}$ to extract the symbol $x_1''\sim x_{M+\delta-L-1}''$ transmitted by the source node 510 while viewing the signal transmitted by the relay node 520 as interference.

Finally, the destination node 530 will receive the signal $y_{530,k}=h_{r,530}x_k'+(I_{s,k}+n_k')$ and the destination node 531 will receive the signal $y_{531,k}=h_{s,531}x_k''+(I_{r,k}+n_k'')$. Both of the destination nodes 530, 531 may use the conventional decoding method to extract the transmitted signal from the source node 510. It is noted that the destination node 330 in diversity mode has to use ML decoding method to extract the transmitted signal from the source node 310, since the received signal in the destination node 330 is a combination of two different symbol comprising a current symbol and a past symbol. As a result, the destination node 330 in diversity mode has to use more complex method to demodulate the signal. However, in multiplexing mode, since the received signal in the destination node 530 or in the destination node 531 only receive one symbol at each time, so the destination node 530 or 531 can use conventional method to demodulate the signal.

Therefore, the destination node 530 simply demodulates the received signal into $x_k'$ with interference $I_{s,k}$ and noise $n_k'$, where $h_{r,530}$ is the channel between the relay node 520 and the destination node 530 assuming the channel is single tap, $I_{s,k}$ is the interference caused by the source signal and $n_k'$ is the received noise at the destination node 530. The destination node 531 simply demodulates the received signal into $x_k''$ with interference $I_{r,k}$ and noise $n_k''$, where $h_{s,531}$ is the channel between the source node 510 and the destination node 531 assuming the channel is single tap, $I_{r,k}$ is the interference caused by the relay node 520 and $n_k''$ is the received noise at the destination node 531.

In short, in the method for relaying signal in multiplexing mode, the relay receives only the current symbol from source. The relay may demodulate the received signal, re-modulate the demodulated symbol with lower modulation type than source and transmit the re-modulated symbol to two destinations. As such, the process of re-modulated and delay also enable relay to remove the noise signal when receiving signal from source and prevent relay from forwarding unwanted noise signal to destinations. As a result, although each destination still faces certain interference, the system throughput is improved by two streams simultaneously since there are two destinations involving in the transmission.

In summary, in the method of relaying signal proposed by the embodiments of the disclosure, there are two different transmission topologies including the diversity mode and the multiplexing mode. In the diversity mode, the relay receives a combined signal comprising a current symbol and a past symbol with power allocation respectively. The relay may demodulate the received combined signal from source, re-modulates the demodulated symbol with same modulation type as the source and transmits the re-modulated symbol to destination. In the multiplexing mode, the relay receives only the current symbol from source. But the relay may demodulate the received signal, re-modulates the demodulated symbol with lower modulation type than source and transmits the re-modulated symbol to multiple destinations. As a result, through the mechanism of relaying signal, the method proposed by the disclosure not only enables the source to the destination a higher network throughput but also improves the system performance, and further provides a better service for the client.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for relaying signal applicable to a relay, comprising:
   receiving, by a transceiver circuit of the relay, a signal with power allocation from a source;
   demodulating the signal to extract a symbol;
   re-modulating the symbol to a re-modulated symbol; and
   transmitting, by the transceiver circuit of the relay, the re-modulated symbol to a destination according to a specific delay,
   wherein the signal with power allocation is a combined signal comprising a current symbol and a past symbol with power allocation respectively,
   wherein the signal with power allocation transmitted by the source is expressed as:

$$s_k = \begin{cases} \sqrt{\alpha}\, x_k & , k < \delta \\ \sqrt{\alpha}\, x_k + \sqrt{1-\alpha}\, x_{k-\delta+1} & , k \geq \delta \\ \sqrt{1-\alpha}\, x_{k-\delta+1} & , k > L \end{cases}$$

wherein k is an any positive integer, $s_k$ represents the signal in a k-th symbol duration, $x_k$ represents a k-th symbol, $\alpha$ represents a power allocation factor, $\delta$ represents a delay factor and L represents a number of total symbols.

2. The method according to claim 1, wherein the symbol is re-modulated by using the same modulation type as the source.

3. The method according to claim 1, wherein the specific delay is a specified time until a certain symbol duration start.

4. The method according to claim 1, wherein the method further comprising:
   rotating the re-modulated symbol by multiplying a rotation factor.

5. The method according to claim 1, wherein the destination demodulates a received signal by using a maximum likelihood (ML) decoding.

6. The method according to claim 1, wherein the method further comprising:
   transmitting the re-modulated symbol to another destination according to the specific delay.

7. The method according to claim 6, wherein the symbol is re-modulated by using a lower modulation type than the source.

8. The method according to claim 6, wherein the power allocation comprises a power allocation factor with value of one.

9. A relay, comprising:
a transceiver circuit, configured to transmit and receive wireless signals;
a storage circuit, storing a plurality of program codes; and
a processing circuit, coupled to the transceiver circuit and the storage circuit and configured to access the program codes to perform operations of:
receiving a signal with power allocation from a source through the transceiver circuit;
demodulating the signal to extract a symbol;
re-modulating the symbol to a re-modulated symbol; and
transmitting the re-modulated symbol to a destination according to a specific delay through the transceiver circuit,
wherein the signal with power allocation is a combined signal comprising a current symbol and a past symbol with power allocation respectively,
wherein the signal with power allocation transmitted by the source is expressed as:

$$s_k = \begin{cases} \sqrt{\alpha}\, x_k & , k < \delta \\ \sqrt{\alpha}\, x_k + \sqrt{1-\alpha}\, x_{k-\delta+1} & , k \geq \delta, \\ \sqrt{1-\alpha}\, x_{k-\delta+1} & , k > L \end{cases}$$

wherein k is an any positive integer, $s_k$ represents the signal in a k-th symbol duration, $x_k$ represents a k-th symbol, $\alpha$ represents a power allocation factor, $\delta$ represents a delay factor and L represents a number of total symbols.

10. The relay according to claim 9, wherein the symbol is re-modulated by using the same modulation type as the source.

11. The relay according to claim 9, wherein the specific delay is a specified time until a certain symbol duration start.

12. The relay according to claim 9, wherein the processing circuit further access the program codes to perform an operation of rotating the re-modulated symbol by multiplying a rotation factor.

13. The relay according to claim 9, wherein the destination demodulates a received signal by using a maximum likelihood (ML) decoding.

14. The relay according to claim 9, wherein the processing circuit further access the program codes to perform an operation of transmitting the re-modulated symbol to another destination according to the specific delay.

15. The relay according to claim 14, wherein the symbol is re-modulated by using a lower modulation type than the source.

16. The relay according to claim 15, wherein the power allocation comprises a power allocation factor with value of one.

* * * * *